United States Patent
Bungarten et al.

[11] Patent Number: 6,099,084
[45] Date of Patent: Aug. 8, 2000

[54] TWIST BEAM AXLE AND METHOD OF PRODUCING SAME

[75] Inventors: Dieter Bungarten, Neustadt, Germany; Olaf Elsner, Basel, Switzerland; Herbert Linden, Swisttal, Germany; Karl-Heinz von Zengen, Bonn, Germany; Peter Harbig, Werther, Germany; Joachim Löwen, Bielefeld, Germany; Franz Steimmel, Wennigsen, Germany; Walther Hasenpatt, Lengerich, Germany; Kai-Uwe Jentsch, Moers, Germany; Jörg Ebert, Köln, Germany; Michael Hellenkamp, Wesseling, Germany; Gerhardt Söllner, St. Augustin, Germany

[73] Assignees: VAW aluminium AG; Thyssen Umformtechnik GmbH, both of Germany

[21] Appl. No.: 09/065,509

[22] Filed: Apr. 24, 1998

Related U.S. Application Data

[63] Continuation-in-part of application No. 08/561,101, Nov. 21, 1995, Pat. No. 5,800,024.

[30] Foreign Application Priority Data

Nov. 25, 1994 [DE] Germany ................ 44 41 971

[51] Int. Cl.[7] .................................................. B60B 35/06
[52] U.S. Cl. .......................................... 301/127; 280/721
[58] Field of Search ................................. 301/124.1, 127; 180/905; 280/721, 723

[56] References Cited

U.S. PATENT DOCUMENTS

| | | | |
|---|---|---|---|
| 4,082,578 | 4/1978 | Evancho et al. | 148/12.7 A |
| 4,787,680 | 11/1988 | Bonjean et al. | 301/127 X |
| 4,842,298 | 6/1989 | Jarvis | 280/689 |
| 4,951,962 | 8/1990 | Tomida et al. | 301/127 X |
| 5,332,281 | 7/1994 | Janotik et al. | 296/209 |
| 5,364,128 | 11/1994 | Ide | 280/784 |

FOREIGN PATENT DOCUMENTS

| | | | |
|---|---|---|---|
| 0548859(A1) | 6/1993 | European Pat. Off. | |
| 2618733 | 2/1989 | France | 301/127 |
| 4330192 A1 | 3/1994 | Germany. | |

*Primary Examiner*—Russell D. Stormer
*Attorney, Agent, or Firm*—Perman & Green, LLP

[57] ABSTRACT

The invention relates to an integral motor vehicle rear axle of the twist-beam axle type, which comprises an opposed pair of longitudinal control arms (2) of a high flexural strength and torsional stiffness for carrying a wheel carrier for a wheel, and a transverse strut (3) which is resistant to bending but resilient relative to torsional stress and which comprises a profiled cross-section changing the position of the shear center. The transverse strut (3) consists of an extruded aluminum profile with an extrusion structure extending in the longitudinal direction of the transverse strut. A method of producing a motor vehicle rear axle of the twist-beam axle type using transverse struts and longitudinal control arms consists in joining the longitudinal control arms (2) with a transverse carrier or strut (3) which, at each end, comprises a bore, opening or bonding surface extending transversely to the longitudinal axis, and in connecting said longitudinal control arms in a form-fitting and force-locking way, such as by hydro-forming, welding or similar methods.

5 Claims, 17 Drawing Sheets

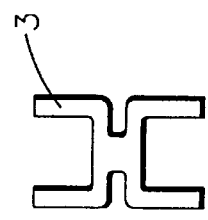
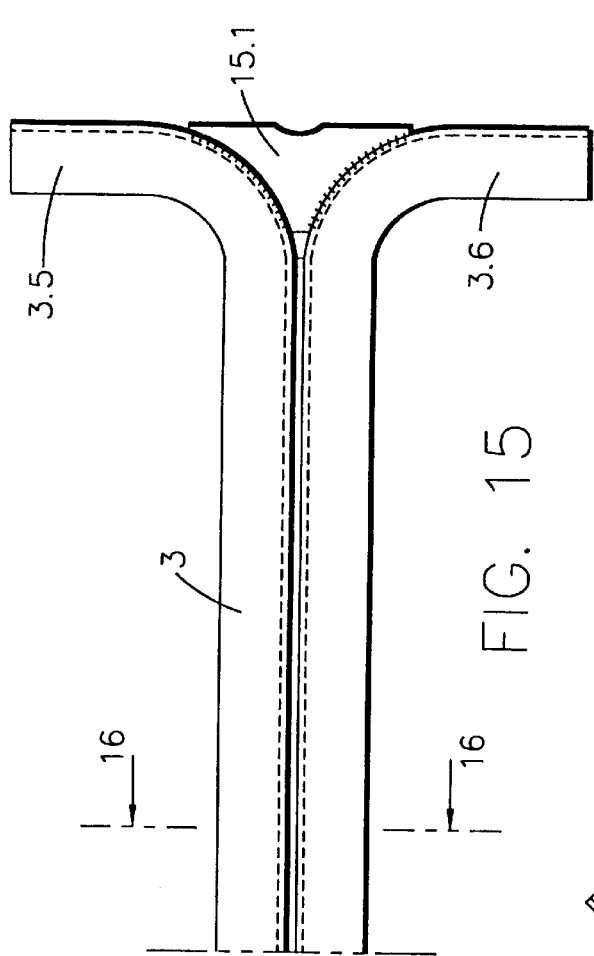
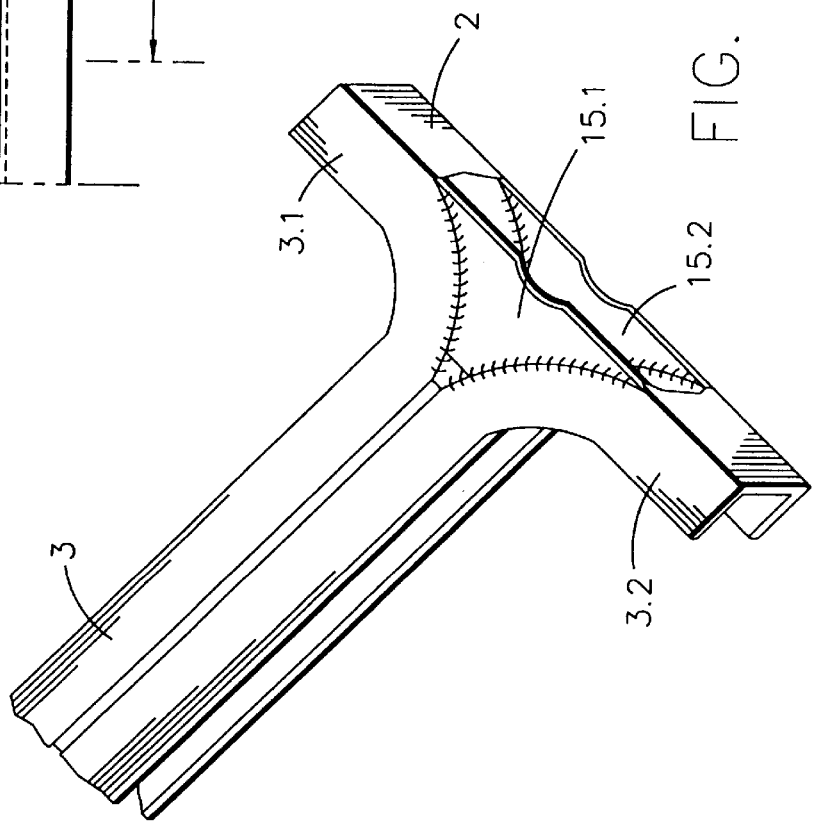

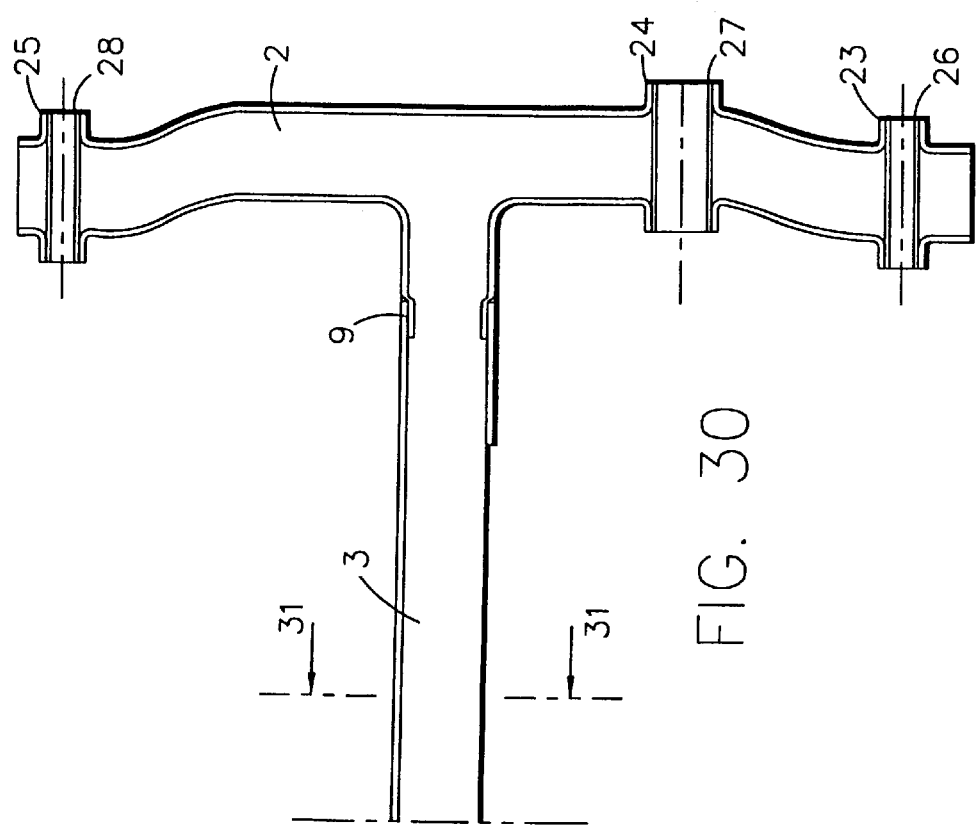
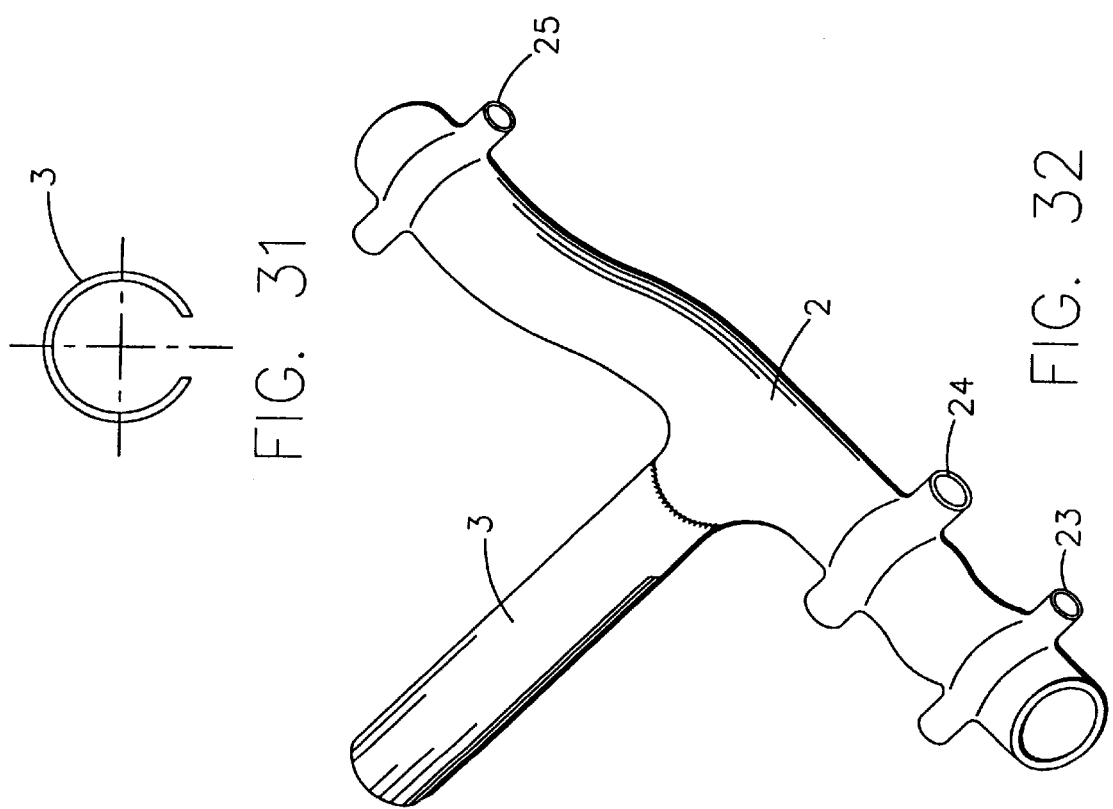

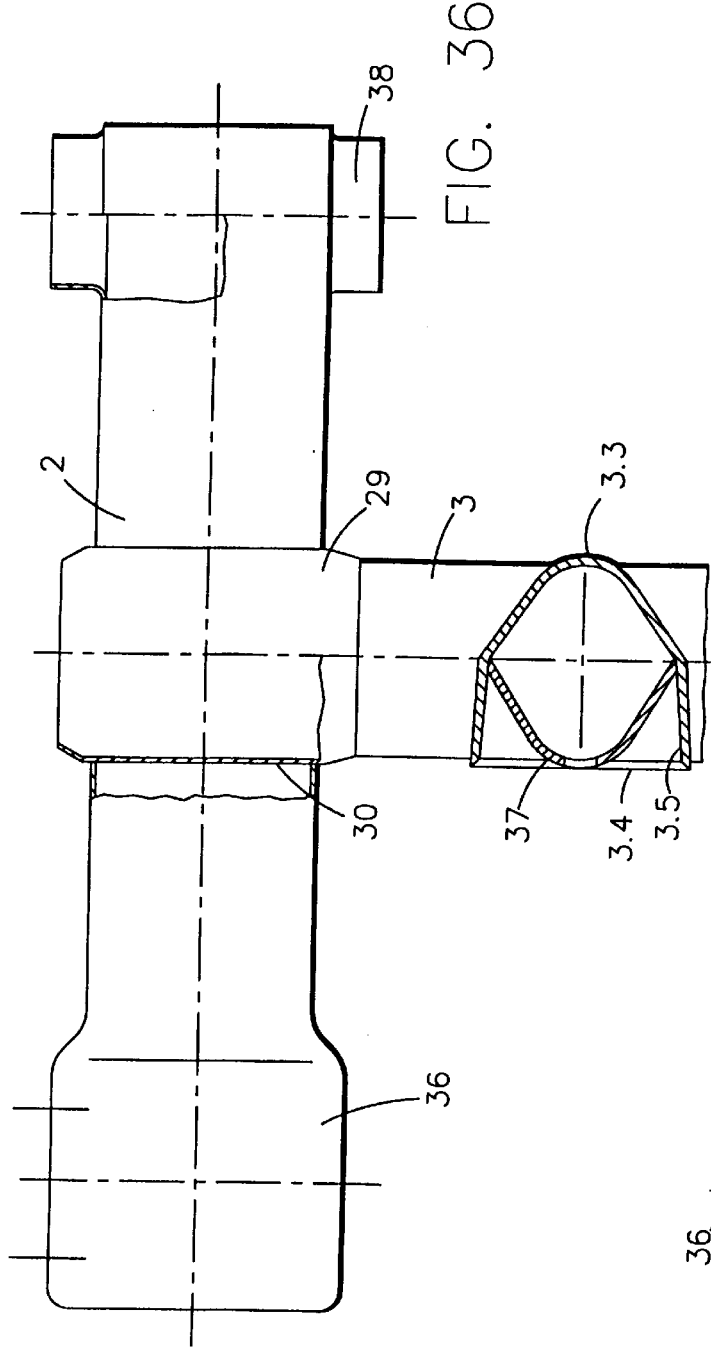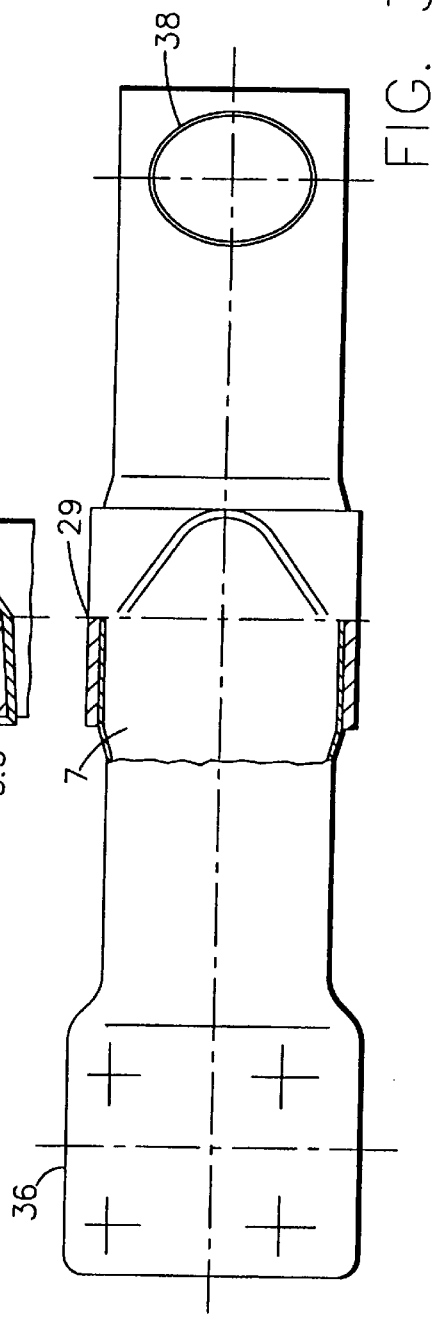

TWIST BEAM AXLE AND METHOD OF PRODUCING SAME

This application is a continuation-in-part of application Ser. No. 08/561,101 filed on Nov. 21, 1995 now U.S. Pat. No. 5,800,024.

BACKGROUND OF THE INVENTION

The invention relates to a motor vehicle rear axle assembly of the twist-beam axle type, comprising a longitudinal control arm 2 of a high flexural strength and torsional stiffness which carries a wheel carrier for a wheel, and a transverse strut 3 which is resistant to bending but resilient relative to torsional stress and which comprises a profiled cross-section changing the position of the shear center. The invention also relates to a method of producing said motor vehicle rear axle control arm assembly.

Motor vehicle rear axles of the aforementioned type are known from DE 43 30 192 A1 wherein a transverse strut having a U-profile cross-section is aligned and fitted in such a way that the upwardly extending angular U-profile raises the potential torsional axis of the transverse strut and achieves a correspondingly high shear center. The purpose of using such a U-profile is to achieve a method of construction which is uncomplicated from the point of view of welding technology and a good natural steering behavior due to only little or no oversteering tendencies. The prior art U-profile is bent out of metal plate with a uniform wall thickness. In the regions of transition to the longitudinal control arms, the legs of the U-profile are welded together to form a rigid box profile, with the two ends of the transverse strut being inserted into laterally open longitudinal control arms and connected to upper and lower plate metal dishes.

The U-profile of the transverse strut as described in DE 43 30 192 A1 is not uniformly aligned along the entire length of the transverse strut, as has previously been the case, but in the region between the two longitudinal control arms it is twisted around the longitudinal axis of the transverse strut, relative to the transverse strut ends welded to the longitudinal control arms, the twisting being such that in the central portion of the transverse strut, the axis of symmetry of the U-profile assumes a different inclination relative to the longitudinal extension of the longitudinal control arm and the road surface plane than in the end portions welded to the wall portions. Such twisting achieves the initially mentioned displacement of the hypothetical torsional axis and shear center within a narrow range illustrated by the axes I and II in FIG. 1 of DE 43 30 192 A1.

For a large number of applications, the possibility of a limited displacement of the shear center according to DE 43 30 192 A1 is not adequate. Furthermore, the wall of the U-profile must be thin, for reasons of weight, the permissible load values, especially in the case of cyclic loads, have to be kept very low for a transverse strut produced in the conventional way, because the twisted arrangement of the transverse strut ends may lead to a great deal of deformation and, in the case of excessive loads, even to cracks in the surfaces of the transverse struts, thus increasing the risk of fracture of the motor vehicle rear axle.

With reference to a motor vehicle rear axle of the initially mentioned type it is therefore the object of the invention to achieve a high degree of variability in arranging the torsional axis and shear center and thus a largely independent possibility of creating the natural steering behavior and, at the same time, to increase the permissible load values, especially in the case of cyclic loads, while achieving advantageous weight/wall thickness ratios.

SUMMARY OF THE INVENTION

In accordance with the invention, the objective is achieved by the characteristics of the appended apparatus claims. An advantageous method of producing the motor vehicle rear axle in accordance with the invention is described by the characteristics of the appended method claims.

Comprehensive tests have shown that, under certain conditions, using extruded aluminum profiles for producing transverse struts leads to surprising advantages with the following characteristics;

1. great variability in arranging and controlling the hypothetical torsional axis and shear center of the transverse strut;
2. a high specific load relative to the weight of the composite steering axle;
3. the connection with the longitudinal strut is resistant to torsion and bending.

One of the most important preconditions for achieving a suitable design of the transverse strut in accordance with the invention is that is comprises an extruded aluminum profile with an extrusion structure extending in the longitudinal direction of the transverse strut, which measure acts against the vaulting force occurring under conditions of torsion, so that in spite of the extruded profile being greatly deformed, cracks due to overloading cannot occur.

In a further embodiment of the inventive concept, the structure of the extruded profile of the transverse strut comprises a banded arrangement of primary precipitates of type AlMn, AlMnFe and AlFe.

The advantages of the motor vehicle rear axle in accordance with the invention can be utilized particularly advantageously by means of a transverse strut extruded from an aluminum alloy of the following composition:

| | |
|---|---|
| Magnesium | 0.4–1.4% |
| Silicon | 0.4–1.5% |
| Copper | 0.01–1.0% |
| Iron | 0.1–0.8% |
| Manganese | 0.01–1.0% |
| Chromium max. | 0.3% |
| Zirconium max. | 0.3% |

Balance aluminum and production-related impurities.

DESCRIPTION OF THE DRAWINGS

The invention will be explained in greater detail with reference to several embodiments illustrated in the attached drawings wherein:

FIGS. 14–16 show an axle segment comprising a transverse strut having a double-T or I-beam, cross-section with a slotted roof surface, integrated into a longitudinal control arm;

FIGS. 20–38 show axle segments comprising transverse struts consisting of slotted tubes with different connections to the longitudinal struts or control arms;

DETAILED DESCRIPTION

Figure 3:
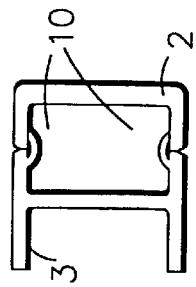
FIGS. 1–9 show an axle segment comprising a transverse strut/longitudinal control arm assembly in accordance with the invention, the strut having a double-T or I-beam cross-section.
Figure 2:
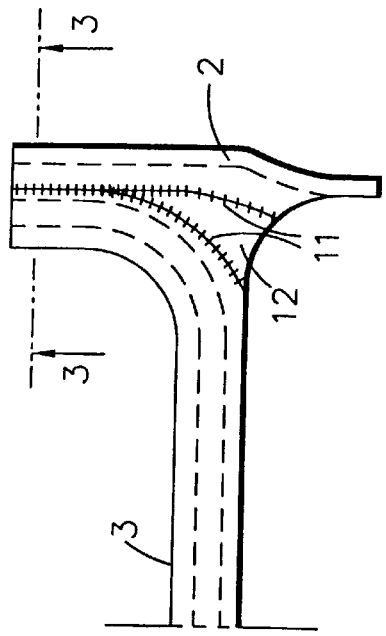
Figure 1:
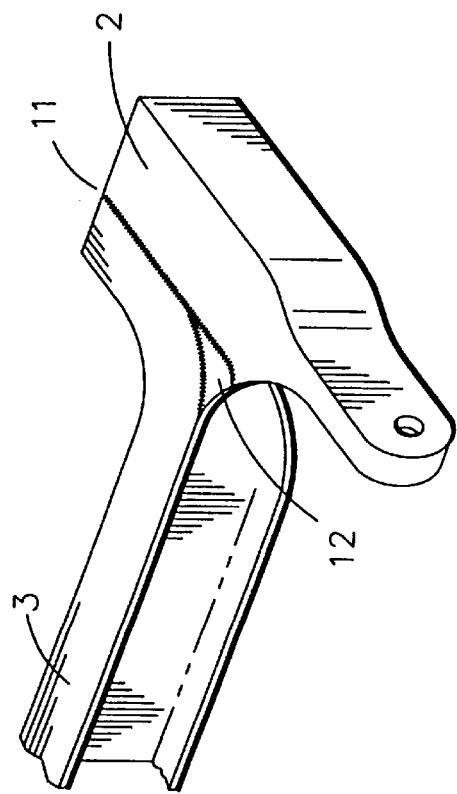
Figure 6:
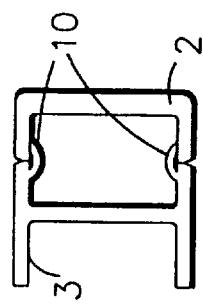
Figure 5:
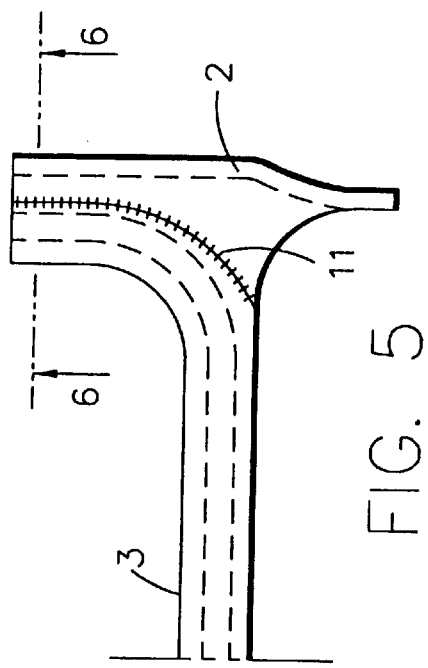
Figure 4:
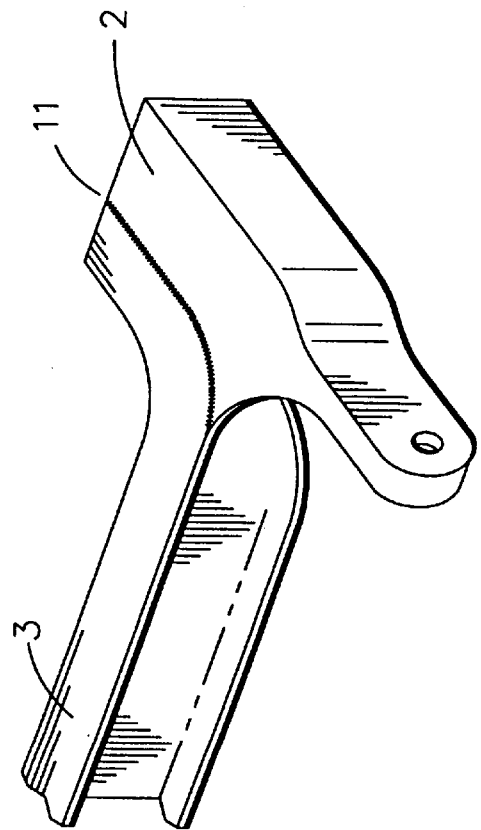
Figure 9:
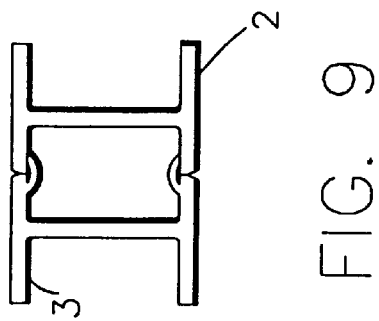
Figure 8:
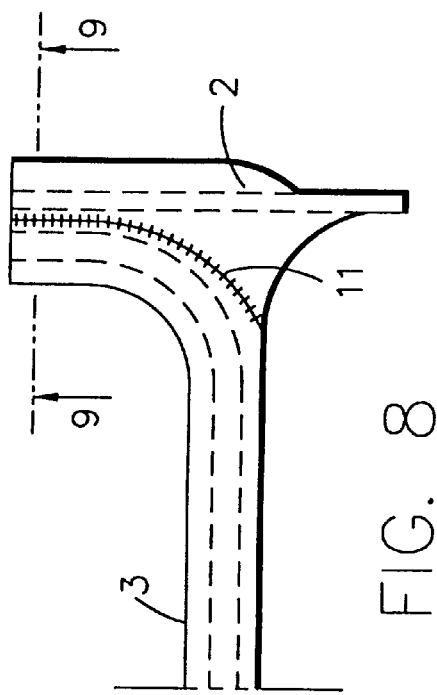
Figure 7:
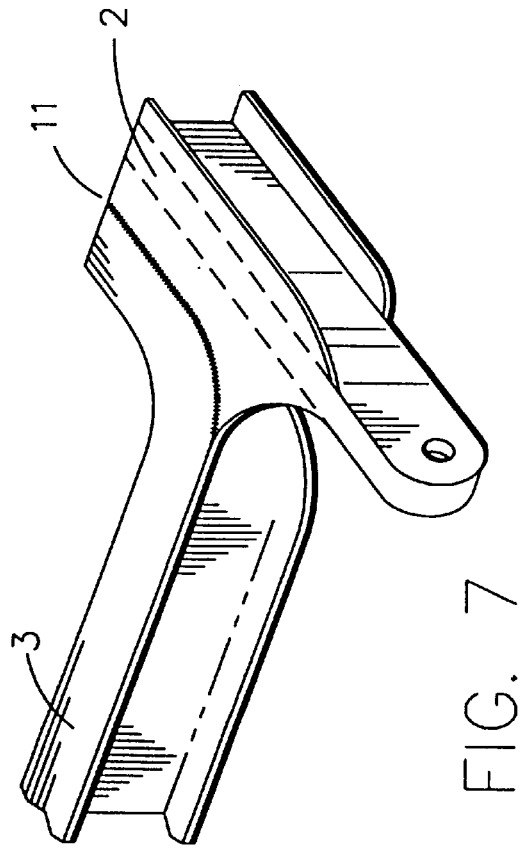
Figure 12:
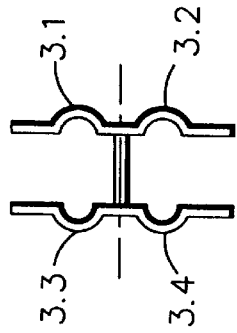
FIGS. 10–13 show an axle segment comprising a transverse strut/longitudinal control arm assembly consisting of a double-T or I-beam cross-section with a ribbed roof surface.
Figure 13:
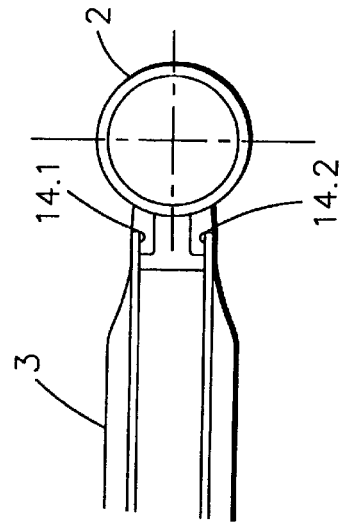
Figure 11:
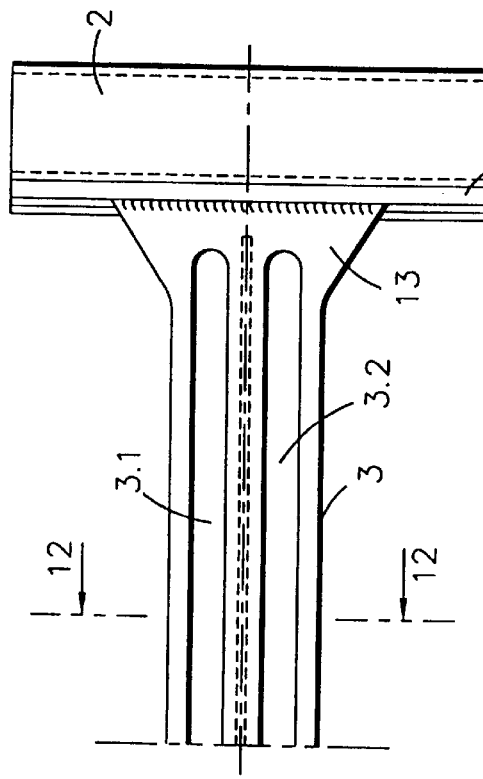
Figure 10:
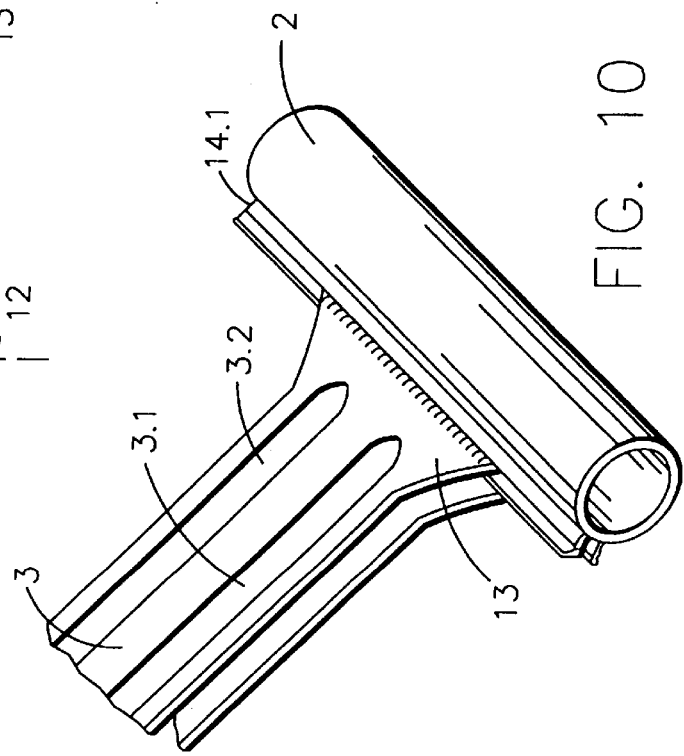

FIGS. 1–9 show embodiments of a transverse strut 3 welded to a longitudinal control arm 2 in accordance with the invention, consisting of an extruded strut profile which, in a cross-sectional view, has a double-T or I-beam cross-section. FIGS. 1–6 show two different means for connecting the longitudinal carrier or control arm 2 which has a U-shaped cross-section, with a backing support 10 being provided in the connecting zone. The weld 11 extends in said backing support 10, and in FIGS. 1–3 it is necessary to provide a complementary piece 12 to ensure adaptation to the base of the transverse strut 3. In FIGS. 4–6, there is no need for such a complementary piece because the curved shape is cut out of the leg of the U-profile 2. In FIGS. 7–9, the cross-section of the longitudinal carrier 2 has the shape of a double-T-profile or I-beam, so that here again, similarly to FIGS. 4–6, the adapting piece ensuring adaptation to the curved transverse carrier in the zone of transition can be cut out of the upper or roof portion of the double-T-profile. Of the embodiments illustrated, the design according to FIGS. 7–9 is the most advantageous from the point of view of stiffness and connection to the longitudinal control arm.

It should be understood that the present drawings illustrate only half segments of the present twist beam axles since the complimentary non-illustrated segments are identical thereto and integral therewith by means of the continuous transverse strut 3 which is integral with the opposed control arms 2. Each control arm is attached to a wheel carrier plate by conventional means such as welding, bolts, etc. The conventional wheel carrier plates support the wheels of the vehicle in a manner well known to those skilled in the art.

FIGS. 10–13 illustrates a double-T-profile transverse strut 3 in accordance with the invention, having a longitudinal carrier 2 in the form of a round tube. The roof of the double-T profile is ribbed, with the ribs 3.1 and 3.2 in the zone of transition to the longitudinal carrier 2 being flattened, thus producing a widened region 13 permitting a more advantageous connection to the longitudinal control arm 2. For the purpose of receiving the flattened region 13, the longitudinal control arm 2 is provided with an upper and lower flange or backing support 14.1, 14.2 in the longitudinal direction of the longitudinal control arm 2. As a result, the force can flow interference-free from the transverse control arm 3 into the longitudinal control arm 2.

A further variant of the double-T-profile of the transverse strut 2 in accordance with the invention is shown in FIGS. 14–16. The central web of the double-T-profile in accordance with the invention is notched so that, after cutting the notch and bending open the ends 3.5, 3.6, a longitudinal control arm 2 with a cross-section in the shape of a U-profile is obtained. To stiffen the cut and opened notched zone, the longitudinal control arm 2 is welded to triangular insert plates 15.1, 15.2, as shown.

Figure 17:
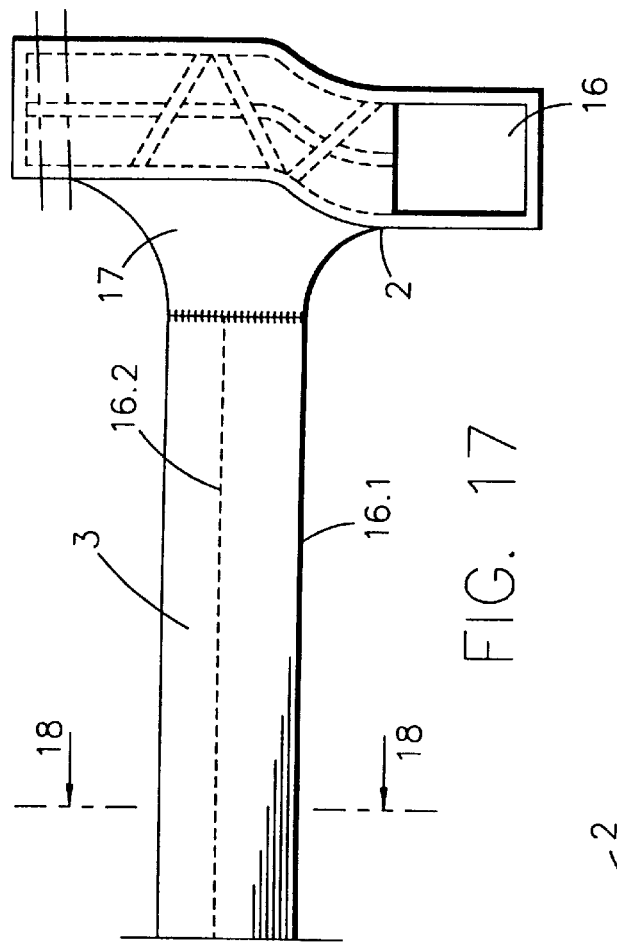
FIGS. 17–19 shows an axle segment comprising a transverse strut in the form of a V-profile or cross-section with reinforced edges, welded to a longitudinal control arm.
Figure 18:
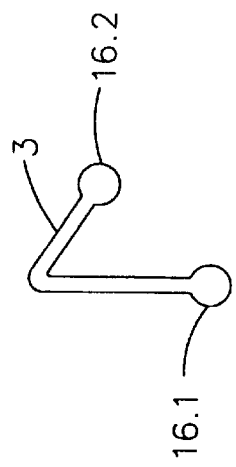
Figure 19:
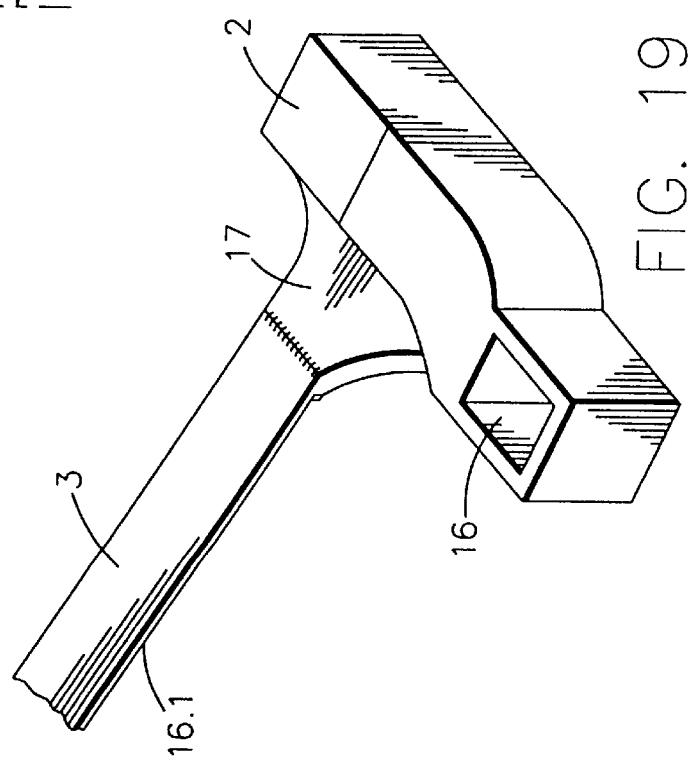

According to FIGS. 17–19, the extruded profile of the transverse strut 3 consists of a V-shaped basic profile which, at its run-out ends, comprises thickened reinforced portions for displacing the shear center. In accordance with the invention, the thickened portions 16.1, 16.2 are positioned in such a way as to achieve the most advantageous shear center for the respective twist-beam axle design. For providing a connection with the longitudinal control arm, there is provided a connecting casting with a triangular cross-section 17 which transmits the force flow in a ribbed longitudinal control arm 2. If provided in the form of a casting, the longitudinal control arm 2 may also be open at one end, which offers advantages in respect of supporting it and connecting it to the body frame. The rectangular opening 16 in the control arm 2 assists flanging the wheel carrier plate to the control arm.

Figure 20:
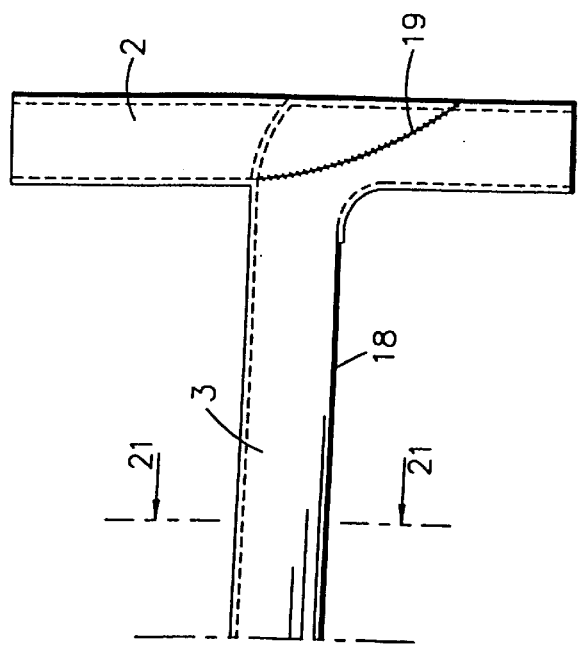
Figure 21:
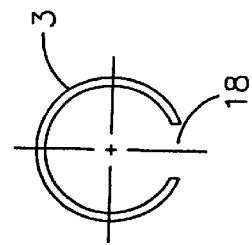
Figure 22:
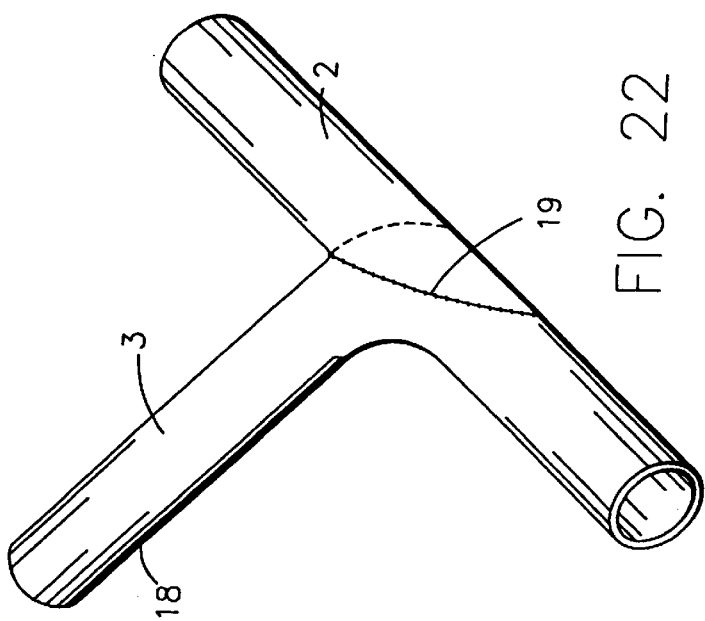

It is also possible to provide the transverse strut 3 and the longitudinal control arm 2 in one piece, which is illustrated in FIGS. 20–22, with the transverse strut 3 comprising a flowing end transition at the bend extending towards the longitudinal steering or control arm 2. To ensure that the transverse strut 3 is torsionally flexible, the inside of the strut 3 is provided with a slot 18 which is machined into a tubular profile in the form of an extruded tube. The longitudinal strut is produced by welding the bent transverse strut 3 to an extruded tubular part 2 of the same diameter, with a weld 19 connecting the beveled end of the extruded tube 2 and the correspondingly cut tubular bend of the transverse strut 3.

Figure 23:
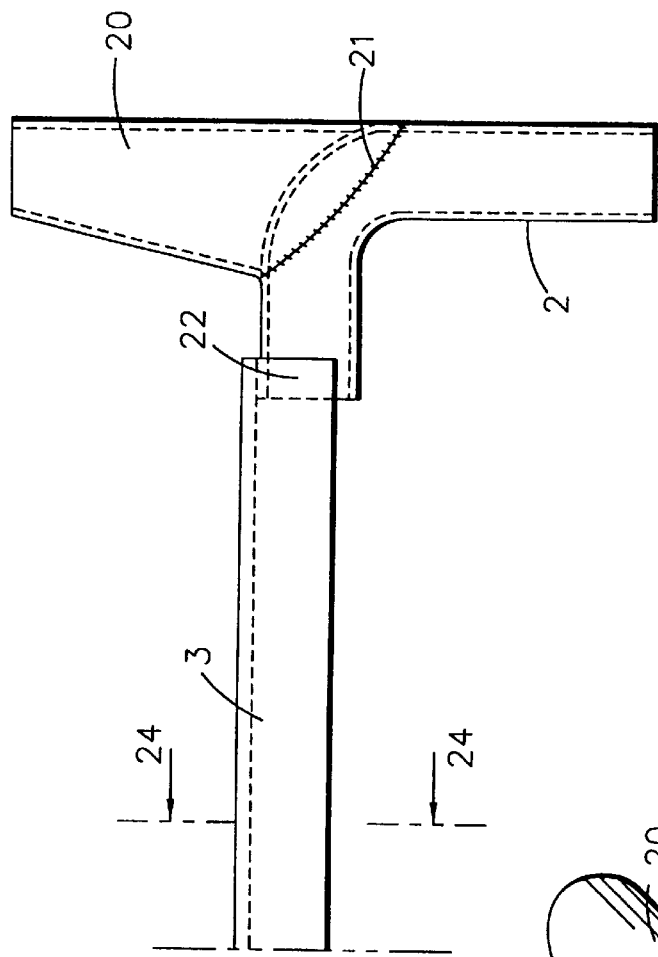
Figure 24:
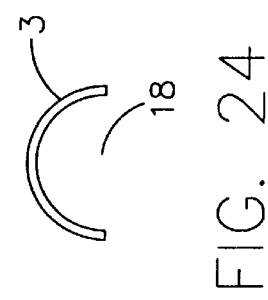
Figure 25:
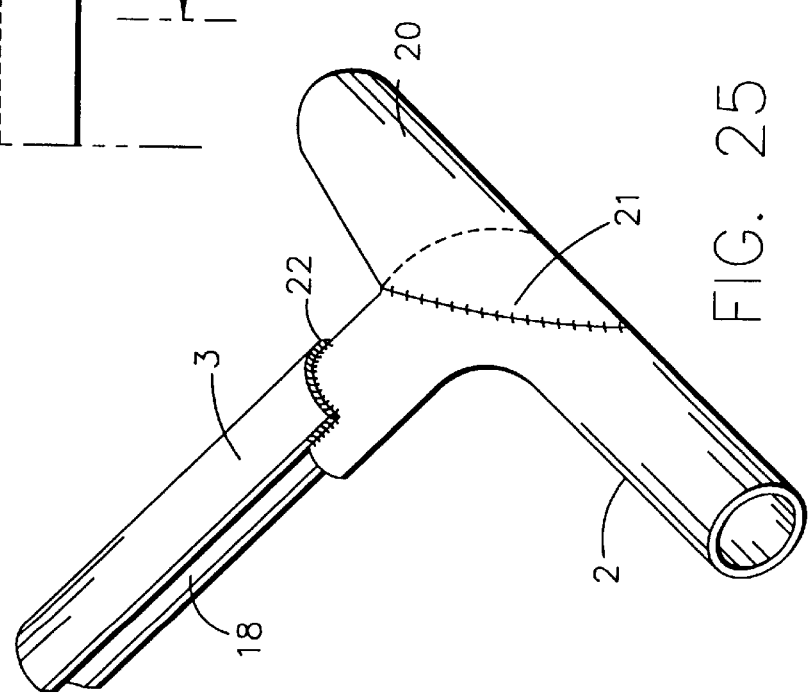
Figure 28:
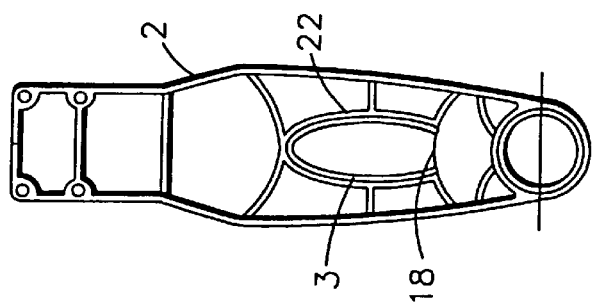
Figure 27:
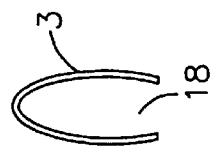
Figure 26:
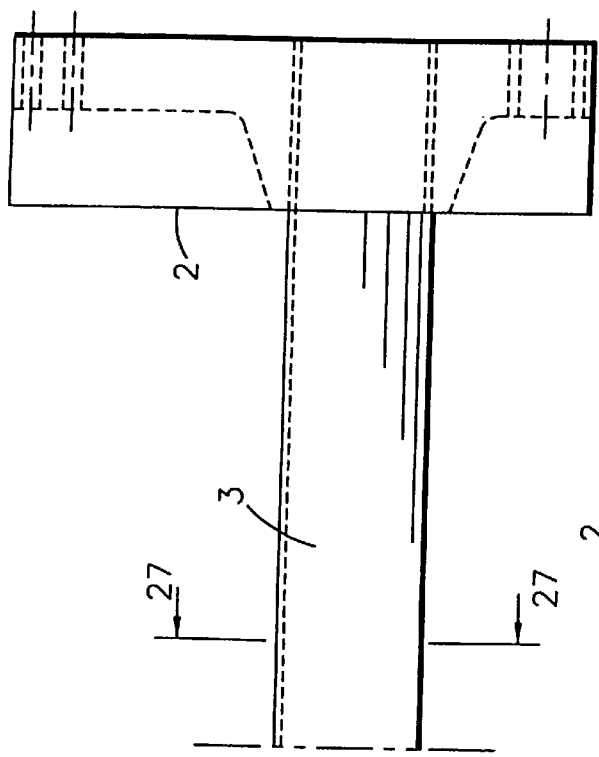
Figure 29:
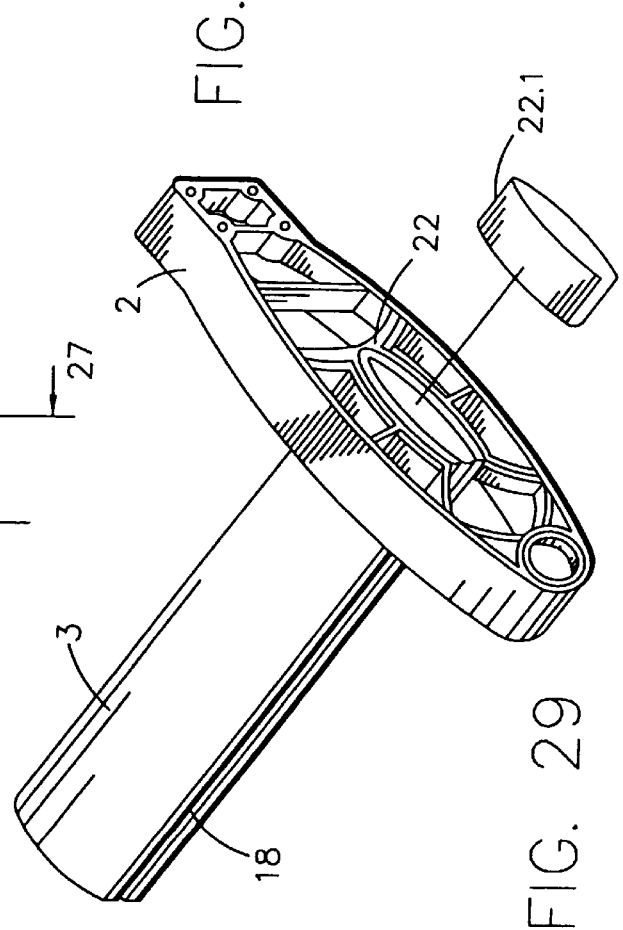

In FIGS. 23–25, analogously to FIGS. 20–22, the longitudinal strut 2 is formed of a tubular bend which is connected to a further extruded profile 20 by means of a weld 21. The transverse strut 3, as an extruded part in tubular form, may be connected by a weld 22, and for setting the torsional stiffness, one wall end is provided with a slot 18.

According to FIGS. 26–29, the transverse strut 3 is also provided in the form of a slotted tube which, in this case, is oval in shape and has a slot 18. The connection with the longitudinal strut 2 is of the form-fitting type because the longitudinal strut 2, in the form of a ribbed extruded profile or casting, is provided with a receiving section 22 adapted to the outer shape of the transverse strut 3. The actual connection may be effected by gluing, welding or shrinking against an insert 22.1.

Figure 33:
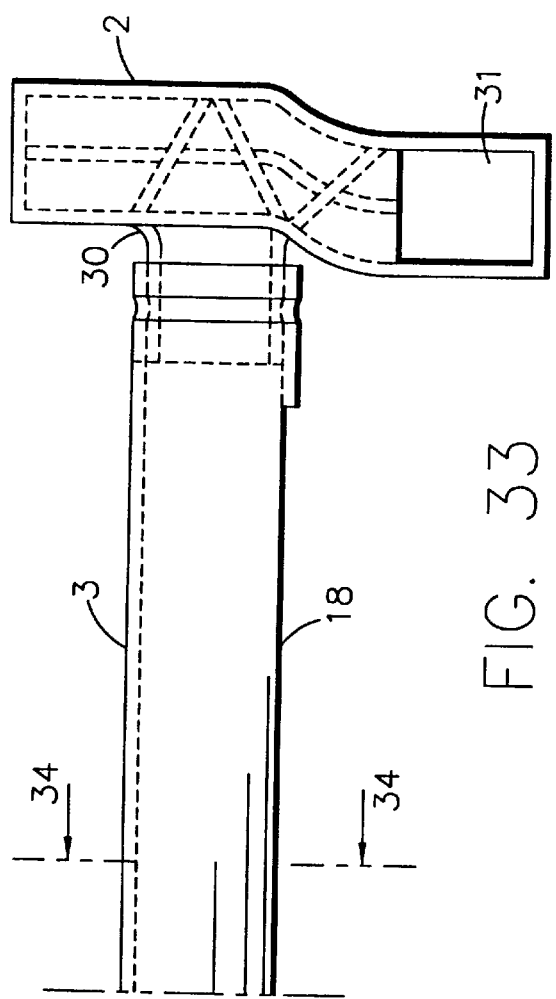
Figure 34:
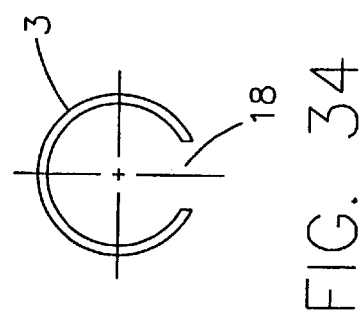
Figure 35:
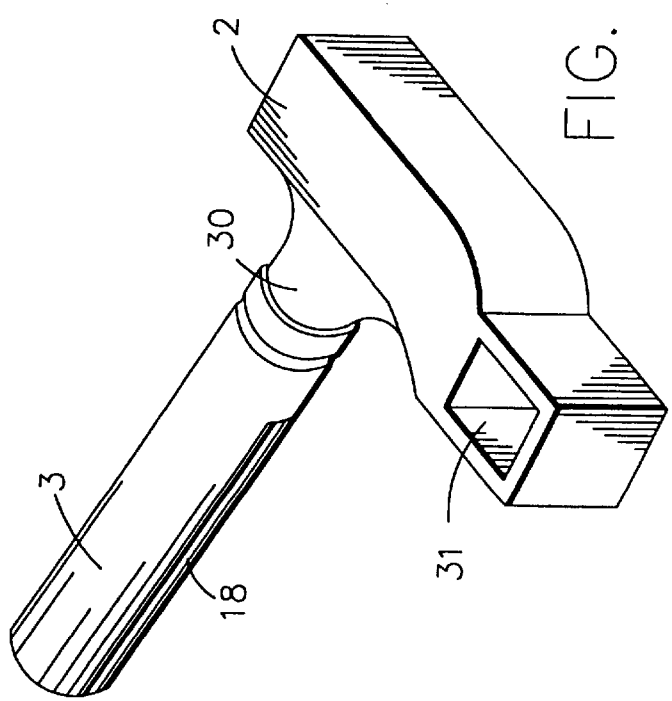

In FIGS. 30–32, the profile cross-sections of the transverse strut 3 and longitudinal control arm 2 are extruded profile cross-sections with a substantially round end cross-section. The special feature here refers to the shape of the longitudinal control arm 2 which, by hydro-forming, was formed out of an originally round tube cross-section into a curved axle part with a plurality of axle projections 23, 24, 25. Bearing bushings 26, 27, 28 are drawn into said projections and fixed by hydroforming. In the connecting zone extending towards the transverse strut 3 there is provided a backing support 9 which extends inside the transverse strut. The purpose of the following Figs. is to show other connecting methods which also produce a torsionally stiff and bending-resistant zone of transition between the transverse strut 3 and the longitudinal control arm 2. In FIGS. 33–35, this is achieved by applying the "Magneform" fixing technology wherein the tubular transverse strut 3 is drawn back over the connecting piece 30 of the longitudinal control arm 2 and then pressed thereagainst until a form-fitting connection is produced. This type of connection is particularly suitable for longitudinal control arms in the form of castings, the important feature being the dimensional stability of the surface of the connecting piece 30. Opening 31 in the control arm 2 is an attachment means for the wheel plate.

According to FIGS. 36 and 37, the transverse strut 3 is connected to the longitudinal control arm 2 by hydroforming. The initially closed transverse control arm profile 3 with the cross-sectional stampings 3.3., 3.4, 3.5, by subjecting it to hydroforming at its end, is expanded to form a head part 29 and provided with rectangular recess 30. The recess may be accurately produced by milling or punching so that the longitudinal control arm 2 may be inserted in a form-fitting way.

In a further hydroforming process, the formations 36 and 38 in the connecting zone are produced at the end points of the longitudinal control arm 2 through expansion, thus producing a wheel carrier plate or a receiving device for the rubber joint. The means for effecting connections with the body and wheel carrier are thus greatly simplified.

The form-fitting connecting between the transverse strut 3 and the longitudinal control arm 2 can be improved further by a positive engagement 7 in the head part 29. Furthermore, it is possible to apply bonding materials in the joining zone, thus also achieving a material-locking connection. Alternatively, it is possible to use mechanical joining methods such as clinching, through-joining or even thermal methods such as welding. To reduce the torsional stiffness, the transverse carrier 3 is slotted after assembly. The slot plane has been given the reference number 37.

Figure 38:
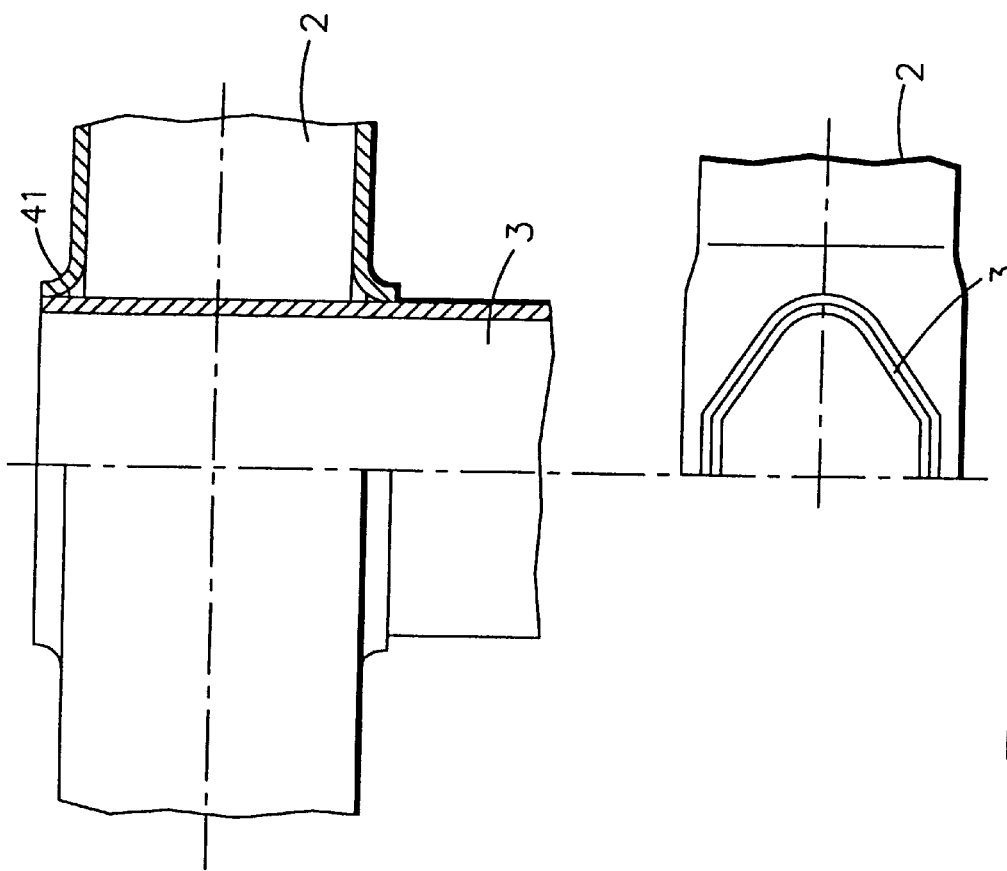

A reversed method of fixing between the transverse carrier 3 and the longitudinal control arm 2 is also possible as shown by FIG. 38. The transverse carrier or control arm 3 is not deformed at its end, but the longitudinal control arm 2 is provided with the recesses or expanded portions 41 into which the transverse control arm 3 is inserted and connected by hydro-forming. In this case, too, additional joining possibilities such as welding, bonding or clinching can be applied. An additional mechanical connection can be provided in that the transverse carrier, in the inserted condition, is expanded in the connecting zone by hydro-forming.

Figure 39:
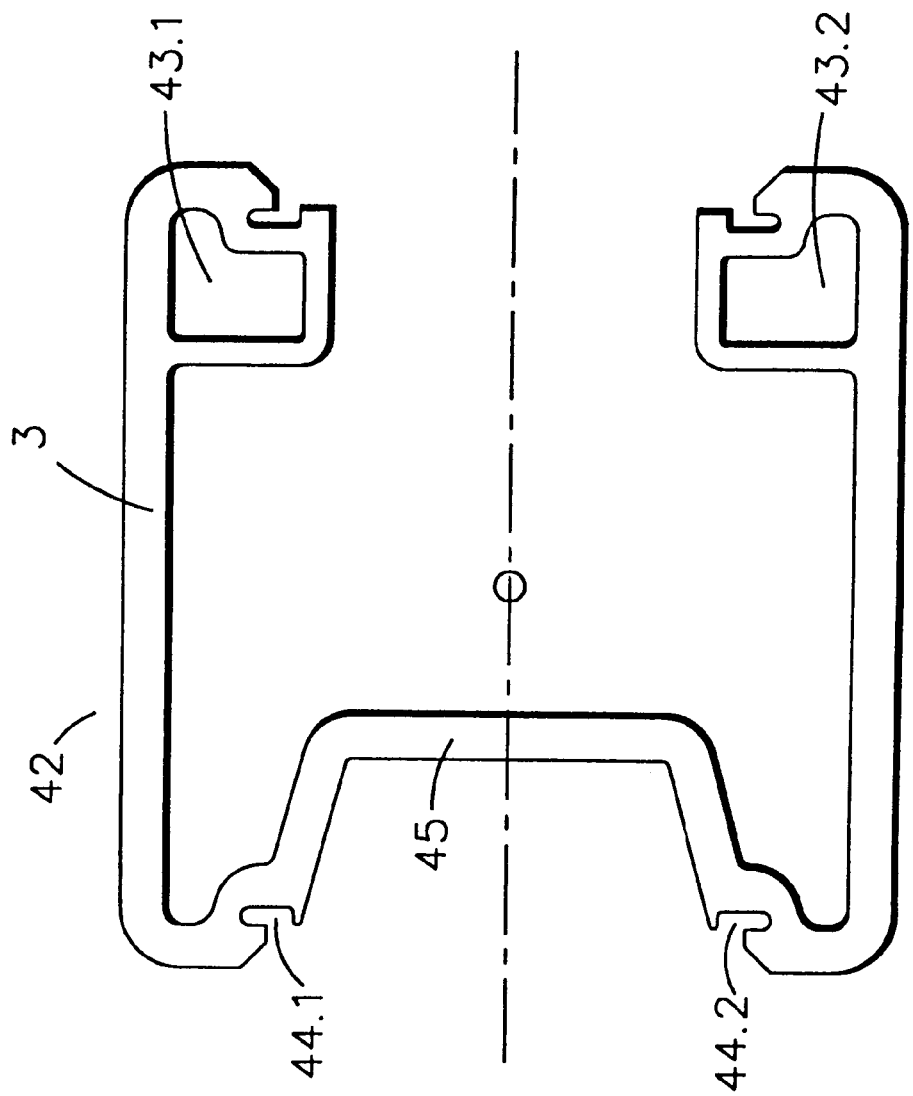
FIG. 39 shows the U-profile cross-section of the transverse strut of FIG. 40.

For the purpose of displacing the shear center and influencing torsional stiffness, the inventive idea is developed further in that closed hollow profiles or sections 43.1 and 43.2 are provided at the open ends of the transverse carrier 3. Such an extruded profile is shown in FIG. 39. By displacing the closed hollow profiles or sections, one achieves a displacement of the shear center without at the same time greatly changing the flexural strength and torsional characteristics of the profile. This method allows torsional stiffness and flexural strength to be selected largely independently of one another, whereas it continues to be possible to freely choose the wall thicknesses of the profile.

Figure 40:
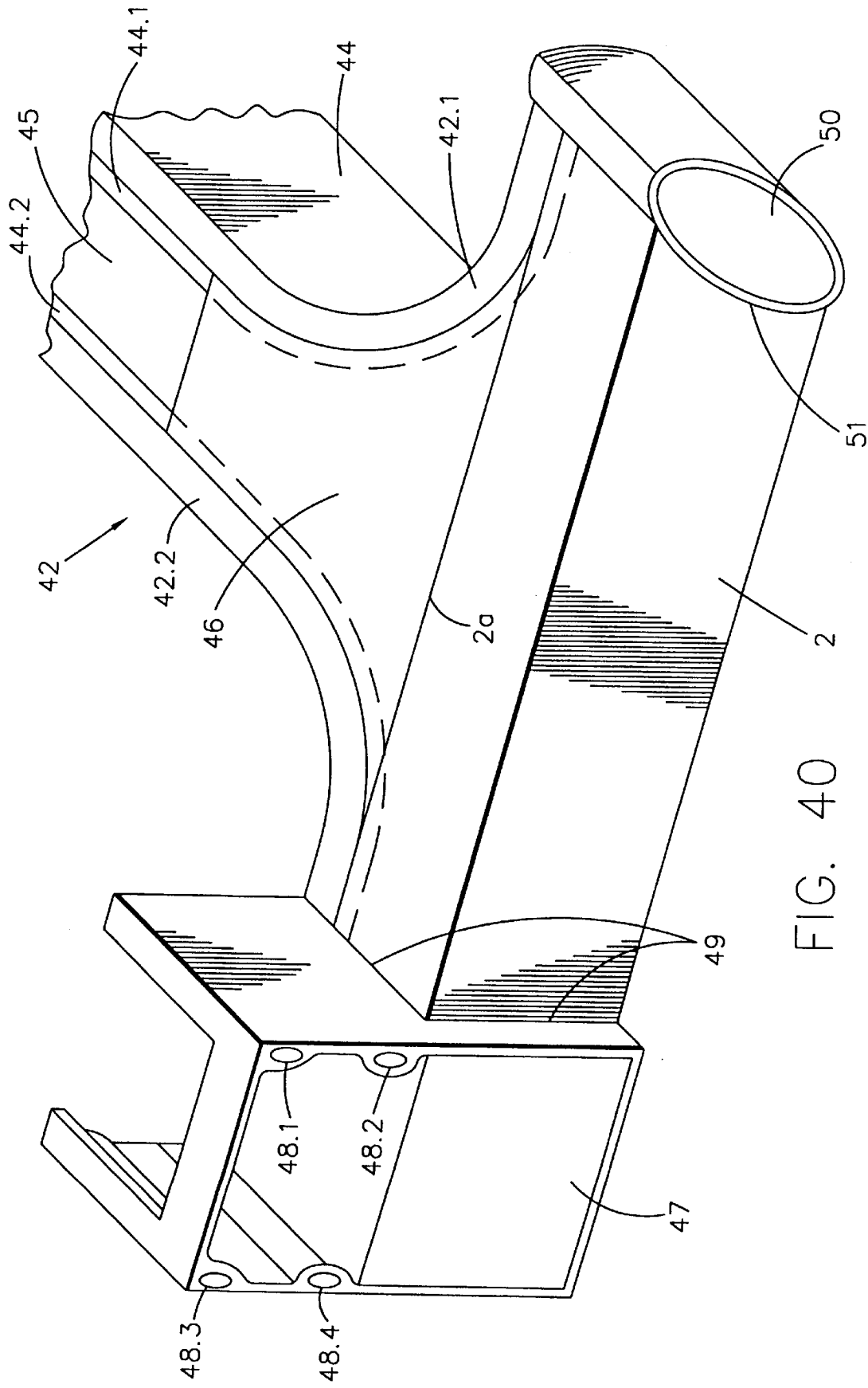
FIG. 40 shows an axle segment comprising the transverse strut of FIG. 39 with an end thereof cut, parted and curved or transitioned in opposite directions as legs which are bonded to a longitudinal control arm integral with a wheel carrier plate.

After removing the connecting piece 45 arranged between the backing supports 44.1 and 44.2 at cuts 45a, the ends or legs 42.1, 42.2 of the section 42 can easily be separated and transitioned outwardly; see FIG. 40. The backing supports 44.1, 44.2 remaining at the separated ends 42.1, 42.2 are inserted into the U-shaped longitudinal control arm profile 2 and welded thereto. The opening occurring between the separated ends 42.1 and 42.2 and the outer edge of the U-shaped longitudinal control arm profile is closed by a gusset-type profile 46 or by a correspondingly shaped plate, using a thermal joining method.

By using a U-shaped, cut plate for the longitudinal control arm 2, it is possible to apply a butt welding processing for connecting the transverse carrier section 42 to the control arm 2 by means of the backing supports 44.1, 44.2.

As usual, the connecting flanges for providing a connection at the body end and at the wheel axle are prepared at the longitudinal control arm 2. FIG. 40 shows a wheel carrier plate section 47 at one end of the longitudinal control arm 2. The wheel carrier plate section 47 consists of an extruded profile extruded in the direction the arrow, which is particularly advantageous for preparing fixing channels 48.1–48.4 for bolting on the axle carrier plate (not shown). The longitudinal control arm 2 is inserted into a recess 49 of the extruded profile and welded thereto.

At the other end of the longitudinal control arm 2, there is provided a tube connection 50 for receiving the rubber joint. The tube connecting piece is also connected to the longitudinal control arm 2 by a weld, with preferably a semi-circular recess 51 being prepared to ensure secure fixing.

Figure 41:
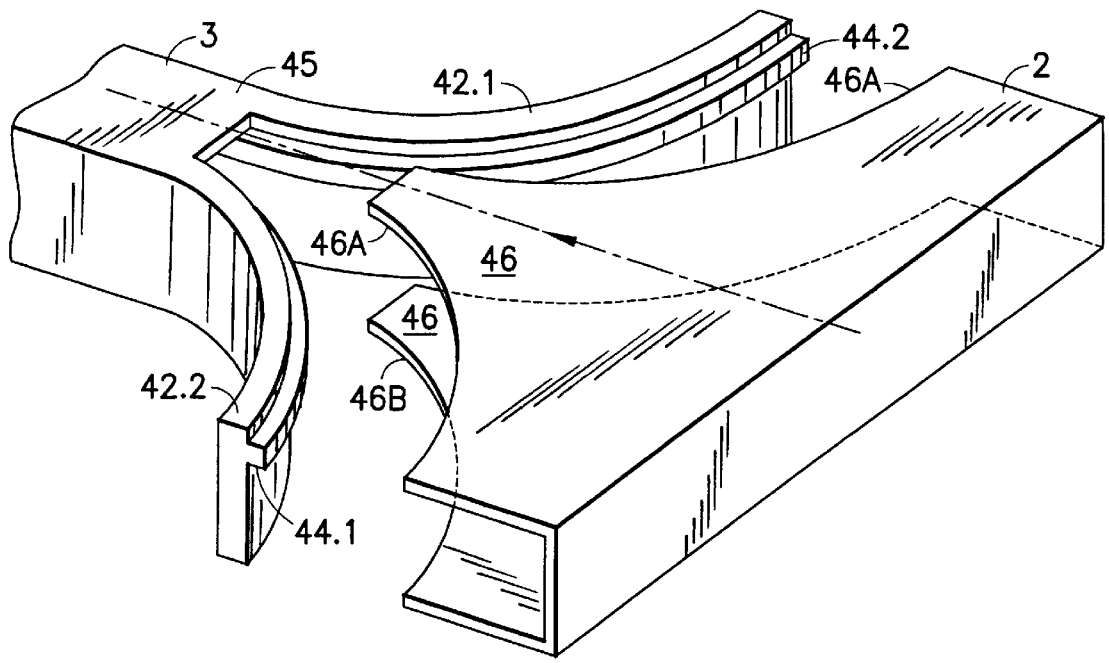
FIG. 41 is a perspective view of a bifurcated end of a transverse strut and a U-shaped longitudinal control arm having companion gusset plates contoured to mate with the transitioned legs of the strut for bonding thereto.
Figure 42:
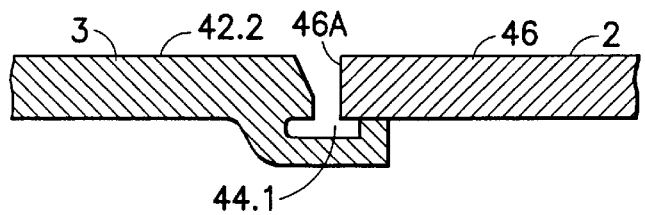
FIG. 42 is a cross-sectional view of the bonding area between the strut leg and the control arm gusset plate.
Figure 43:
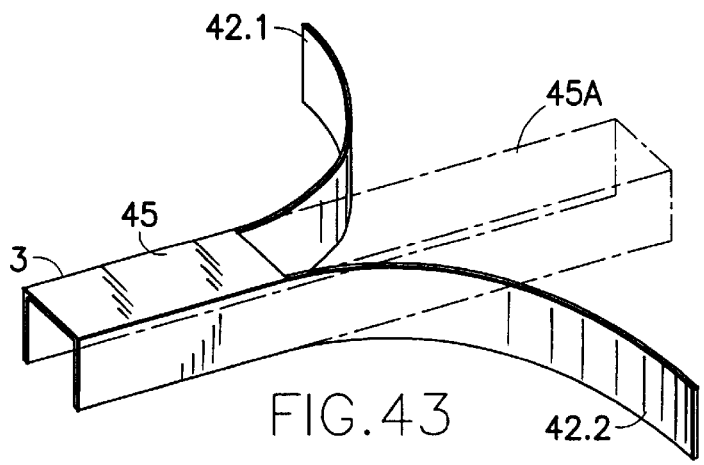
FIG. 43 is a perspective view of the U-shaped transverse strut illustrating the bifurcation step in which an upper wall portion is cut away and the side wall portions are separated and transitioned to form legs.

Referring to the embodiment of the invention illustrated by FIGS. 41–43 of the drawings, which is similar to the embodiment illustrated by FIGS. 39 and 40, the U-cross-section extruded cross member 3 is cut or bifurcated adjacent the backing supports 44.1 and 44.2, a section 45A of the upper section 45 is removed, and the side walls or legs 42.1 and 42.2 are separated or transitioned outwardly as illustrated by FIG. 43.

The bifurcated cross member 3 has opposed legs 42.1 and 42.2 each of which contains a continuous flange or backing support 44.1 and 44.2 to which a longitudinal control arm 2 can be welded or otherwise attached to produce a rear axle of the twist beam axle type having high flexural strength and torsional stiffness.

As illustrated by FIG. 41, the U-shaped longitudinal control arm 2 has upper and lower gusset walls or plates 46 having curved edges 46A and 46B, respectively, corresponding to the curvature of the legs 42.1 and 42.2 of the transverse strut 3, as shown in FIG. 41.

The undersurface of the upper plate 36 is welded, adjacent edge 46A to the backing supports 44.1 and 44.2, as shown in FIG. 42 while the edge 46B of the lower plate 46 is welded to the legs 42.1 and 42.2 adjacent their open ends.

Figure 44:
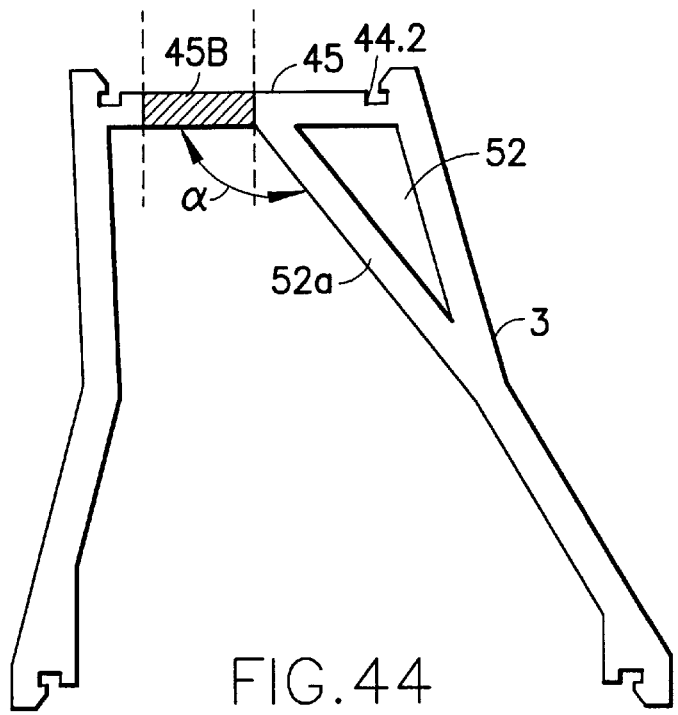
FIGS. 44 and 45 are cross-sectional views of extruded, elongate, U-profile transverse struts having elongate closed hollow sections extending along the connecting wall of the struts.
Figure 45:
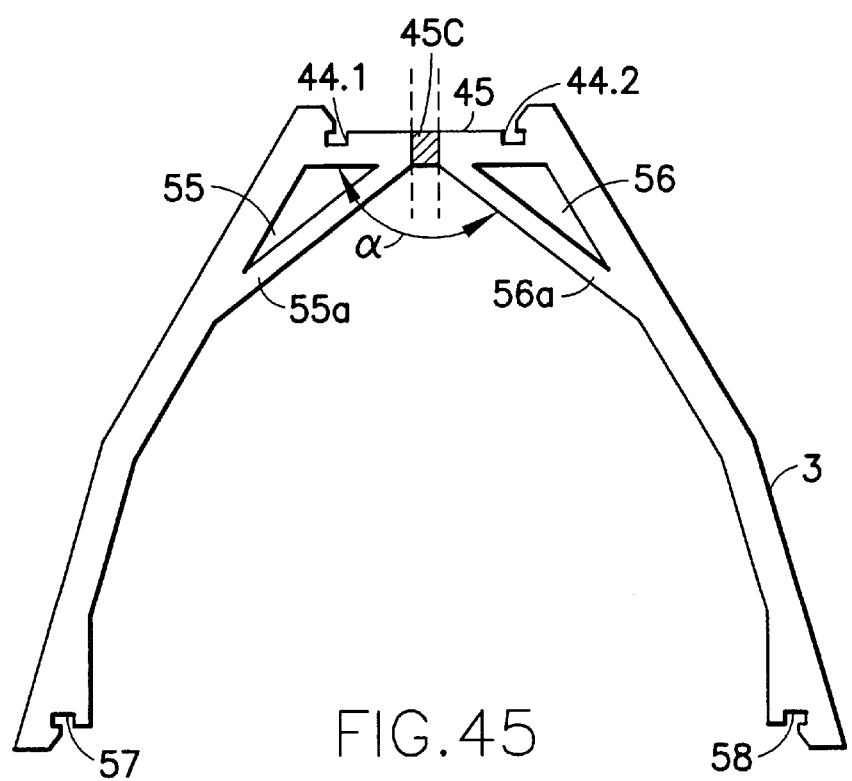

FIGS. 44 and 45 illustrate another embodiment of the invention which is similar to that of FIGS. 39 and 40 in that the bifurcated cross member 3 also has closed hollow sections 52 or 55 and 56 which achieve a displacement of the shear center of the twist-beam axle without greatly changing the flexural strength and torsional characteristics of the assembly.

In the embodiments of FIGS. 44 and 45, the elongate closed hollow sections 52, 55 and 56 extend along the length of the transverse carrier or strut 3 and include the connecting base wall 45 and a side wall 42.1 or 42.2 as walls of the hollow sections 52, 55 and 56, adjacent a backing support 44.1 or 44.2. These hollow sections brace and strengthen or stiffen the elongate transverse struts 3.

The ends of the struts 3 are cut through the connecting wall 45 and strip portions 45B (FIG. 44) and 45C (FIG. 45) are removed and the side walls are separated and transitioned outwardly to form bifurcated ends, similar to the illustration in FIG. 41, to be welded or otherwise connected to a U-shaped control arm similar to arm 2 of FIG. 41.

The upper backing supports 44.1 and 44.2 of FIGS. 44 and 45 are attached, such as butt-welded, to the undersurface of a top gusset plate of a U-shaped control arm, as illustrated by FIG. 42, and the lower backing supports, 53 and 54 of FIG. 44, and 57 and 58 of FIGS. 45, are attached, such as butt-welded, to the upper surface of a lower gusset plate of the control arm, to produce an exceptionally-strong connection therebetween.

The location of the hypothetical shear center and torsional axis of the transverse strut 3 can be controlled or adjusted by changing the shapes of the elongate triangular closed hollow sections 52, 55 and/or 56 by changing the angle at which the brace leg 52*a*, 55*a* and/or 56*a* extends down from or intersects the connecting wall 45, i.e., the angle a shown in FIGS. 44 and 45. This modifies the resistance of the strut to twisting or cyclic loads and thereby changes the hypothetical shear center of the strut 3.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A motor vehicle rear axle of the twist-beam axle type having unitary control arm assembly comprising an opposed pair of longitudinal control arms (2) of a high flexural strength and torsional stiffness, each for supporting a wheel carrier plate for a wheel, and a transverse strut (3) which is resistant to bending but resilient relative to torsional stress and which has a profiled cross-section and which twists to change the location of the shear center thereof, opposed ends of said strut being integral with a said control arm at a joining zone, characterized in that the transverse strut (3) consists of an aluminum extrusion having the following composition:

| | |
|---|---|
| Magnesium | 0.4–1.4% |
| Silicon | 0.4–1.5% |
| Copper | 0.01–1.0% |
| Iron | 0.1–0.8% |
| Manganese | 0.01–1.0% |
| Chromium max. | 0.3% |
| Zirconium max. | 0.3% | balance aluminum and unavoidable impurities and having an extrusion structure extending in the longitudinal direction of the transverse strut, said extrusion structure of said transverse strut comprising primary precipitates of an aluminum alloy selected from the group consisting of AlMn, AlMnFe and AlFe.

2. A motor vehicle rear axle according to claim 1, characterized in that the transverse strut (3), has a hollow profile cross-section in the joining zones with the control arms extending in the longitudinal direction, whereas the remaining regions thereof consist of an extruded open profiled cross-section.

3. A motor vehicle rear axle according to claim 2, characterized in that the hollow profile of the transverse strut (3) is slotted in the longitudinal direction, in the length thereof between said joining zones, with the slot width ranging between 0.1 and 1 mm.

4. A motor vehicle rear axle according to claim 1 in which the transverse strut (3) has a U-cross section comprising side walls (42.1, 42.2) and a connecting base wall (45), and at least one brace leg (52*a*, 55*a* or 56*b*) extending from a side wall to the base wall to form an elongate hollow profile along the length of the transverse strut (3) which displaces the shear center and influences the torsional stiffness of the strut.

5. A motor vehicle rear axle of the twist beam axle type having a unitary control arm assembly comprising an opposed pair of longitudinal control arms (2) of a high flexural strength and torsional stiffness, each for supporting a wheel carrier plate (47) for a wheel, and an elongate transverse strut (3) which extends between said opposed pair of control arms and has opposed ends, said strut being resistant to bending but resilient relative to torsional stress to twist and thereby vary the location of the shear center thereof, and having a profiled hollow cross-section, each of the opposed ends of said strut being united with a said longitudinal control arm, characterized in that the transverse strut (3) consists of an aluminum extrusion having bifurcated ends which transition and curve into opposed longitudinal legs extending in opposed longitudinal directions, parallel to the longitudinal control arms, to provide an opening therebetween, each pair of said legs being connected to a said longitudinal control arm, having a section which extends into said opening and is integral with said legs.

* * * * *